(12) United States Patent
Hwang et al.

(10) Patent No.: US 10,360,885 B2
(45) Date of Patent: Jul. 23, 2019

(54) COGNITIVE MUSIC ENGINE USING UNSUPERVISED LEARNING

(71) Applicant: International Business Machines Corporation, Armonk, NY (US)

(72) Inventors: Inseok Hwang, Austin, TX (US); Jente B Kuang, Austin, TX (US); Janani Mukundan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 239 days.

(21) Appl. No.: 15/473,543

(22) Filed: Mar. 29, 2017

(65) Prior Publication Data

US 2017/0206875 A1     Jul. 20, 2017

Related U.S. Application Data

(63) Continuation of application No. 14/880,372, filed on Oct. 12, 2015, now Pat. No. 9,715,870.

(51) Int. Cl.
*G06N 5/04* (2006.01)
*G10H 1/00* (2006.01)
*G06N 3/08* (2006.01)

(52) U.S. Cl.
CPC ........... *G10H 1/0025* (2013.01); *G06N 3/088* (2013.01); *G06N 5/04* (2013.01); *G10H 2210/081* (2013.01); *G10H 2210/111* (2013.01); *G10H 2210/115* (2013.01); *G10H 2210/125* (2013.01); *G10H 2210/131* (2013.01); *G10H 2210/565* (2013.01); *G10H 2220/101* (2013.01); *G10H 2240/085* (2013.01); *G10H 2250/311* (2013.01)

(58) Field of Classification Search
USPC .......................................................... 84/609
See application file for complete search history.

(56) References Cited

U.S. PATENT DOCUMENTS

| | | |
|---|---|---|
| 5,138,924 A | 8/1992 | Ohya |
| 5,138,928 A | 8/1992 | Nakajima |
| 5,308,915 A | 5/1994 | Ohya |
| 5,883,326 A | 3/1999 | Goodman |
| 6,051,770 A | 4/2000 | Milburn |

(Continued)

OTHER PUBLICATIONS

Hu et al.; "A Probabilistic Topic Model for Unsupervised Learning of Musical Key-Profiles", 10th International Society For Music Information Retrieval Conference on, ISMIR 2009, pp. 441-446.
Lee et al.; "Unsupervised Feature Learning for Audio Classification Using Convolutional Deep Belief Networks", Advances in Neural Information Processing System, 2009, pp. 1096-1104.

(Continued)

*Primary Examiner* — Christopher Uhlir
(74) *Attorney, Agent, or Firm* — Jeffrey LaBaw; William Stock; Mercedes L. Hobson

(57) ABSTRACT

A method for generating a musical composition based on user input is described. A first set of musical characteristics from a first input musical piece is received as an input vector. The first set of musical characteristics is perturbed to create a perturbed input vector as input in a first set of nodes in a first visible layer of an unsupervised neural net. The unsupervised neural net comprised of a plurality of computing layers, each computing layer composed of a respective set of nodes. The unsupervised neural net is operated to calculate an output vector from a higher level hidden layer in the unsupervised neural net. The output vector is used to create an output musical piece.

17 Claims, 9 Drawing Sheets

(56) References Cited

U.S. PATENT DOCUMENTS

| | | |
|---|---|---|
| 7,531,735 B2 | 5/2009 | Koike |
| 7,761,572 B1 | 5/2010 | Beauregard et al. |
| 7,842,874 B2 | 11/2010 | Jehan |
| 8,035,020 B2 * | 10/2011 | Taub .................... G10H 1/0058 84/600 |
| 8,278,545 B2 | 10/2012 | Hamanaka |
| 8,370,277 B2 | 2/2013 | Goto et al. |
| 8,519,249 B2 | 8/2013 | Alcalde et al. |
| 9,076,423 B2 | 7/2015 | Matusiak |
| 9,099,066 B2 | 8/2015 | Welch |
| 9,536,509 B2 | 1/2017 | Esparza |
| 2007/0131095 A1 | 6/2007 | Park et al. |
| 2007/0280270 A1 | 12/2007 | Laine |
| 2009/0272252 A1 | 11/2009 | Ladyjensky |
| 2014/0000440 A1 | 1/2014 | Georges et al. |
| 2014/0298973 A1 * | 10/2014 | Matusiak ............. G10H 1/0025 84/613 |

OTHER PUBLICATIONS

Gkiokas et al.; "Deploying Deep Belief Nets for Content Based Audio Music Similarity", Information, Intelligence, Systems and Applications (IISA), 2014 The 5th IEEE International Conference on, Jul. 7-9, 2014, pp. 180-185.

Correa et al.: "Neural Network Based Systems for Computer-Aided Musical Composition: Supervised × Unsupervised Learning" Jan. 2008, Conference paper. SAC '08, Mar. 16-20, 2008, pp. 1738-1742.

Bickerman et. al. "Learning to Create Jazz Melodies Using Deep Belief Nets" Jan. 2010, Proceedings of the International Conference on Computational Creativity, pp. 228-237.

Web site "WolframTones: About Wolfram Tones" found at http://tones.wolfram.com/about/, Sep. 2015, PDF provided.

Shan "Automated Composer of Style Sensitive Music", Proceedings of the Second Australian Undergraduate Students' Computing Conference, 2004.

List of IBM Patents or Patent Applications Treated As Related.

* cited by examiner

COGNITIVE MUSIC ENGINE USING UNSUPERVISED LEARNING

BACKGROUND

Technical Field

This disclosure relates generally to the field of automated music analysis. More particularly, it relates to using unsupervised learning of musical pieces and computer creation of music based on the unsupervised learning.

Background of the Related Art

Computer aided musical composition is not new. There have been efforts dating from the 1950s using Markov chains to generate music using computers. There has been much work since that time. Neural networks have been used in more recent work to learn musical features in human written music as part of the process by which the computer learns to write music. During the learning, the neural networks have operated in either a supervised or an unsupervised mode. In a supervised mode, the inputs and outputs are controlled by a supervising human user who guides the computer to desired outputs. In an unsupervised mode, the computer does not have human guidance. The computer learns the patterns and features of the music, and organizes its learning into a form which can be used to generate music.

While efforts to provide computer aided musical composition have been many, the actual musical output has been mixed in comparison to music written by a human composer. Further, though the computer output has rarely matched the musical works of a skilled human composer, the effort on the part of highly skilled and intelligent computer scientists has been great. The training needed both to produce skilled computer scientists in the first place, and then for these skilled individuals to prepare the computer aided music systems to produce music in terms of time is considerable. Many systems require a volume of preexisting music data to analyze as well as a detailed set of rules concerning music theory. Typically, the inputs and desired output of these systems has been expressed in non-musical and non-intuitive forms, making them incomprehensible to a layman. Despite over sixty years of effort, current methods have fallen short.

It would be highly desirable to provide computer aided music composition which is accessible to an untrained, non-technical, nonmusician, that is, an average person, which provides real time results.

BRIEF SUMMARY

According to this disclosure, a method for generating a musical composition based on user input is described. A first set of musical characteristics from a first input musical piece is received as an input vector. The first set of musical characteristics is perturbed to create a perturbed input vector as input in a first set of nodes in a first visible layer of an unsupervised neural net. The unsupervised neural net comprised of a plurality of computing layers, each computing layer composed of a respective set of nodes. The unsupervised neural net is operated to calculate an output vector from a higher level hidden layer in the unsupervised neural net. The output vector is used to create an output musical piece.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
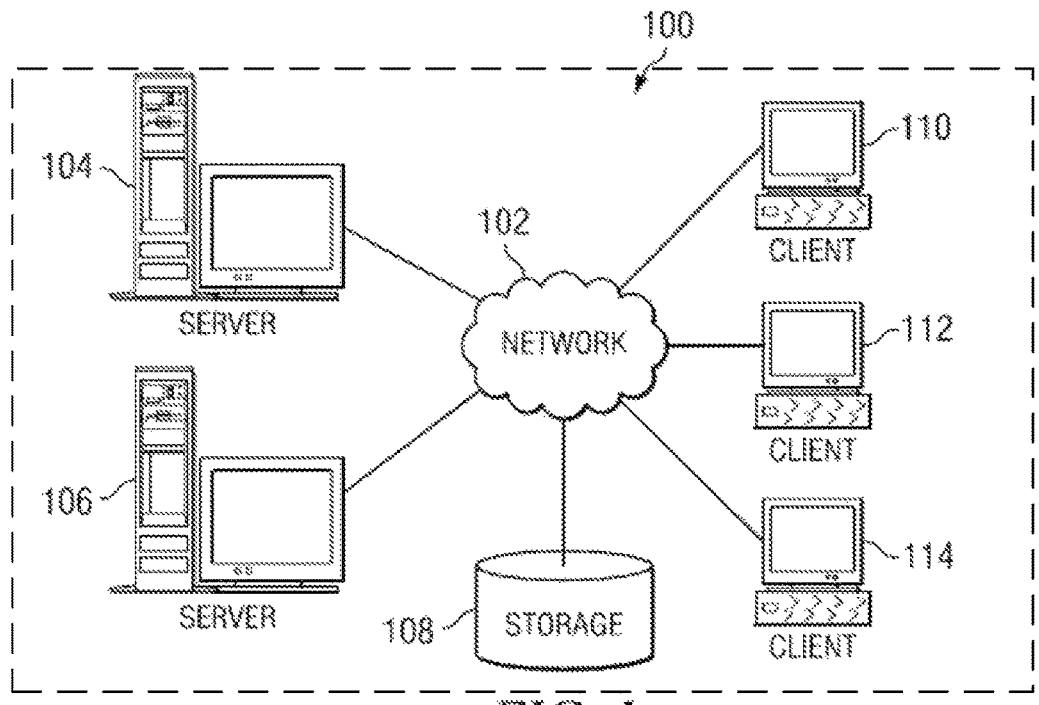
FIG. 1 depicts an exemplary block diagram of a distributed data processing environment in which exemplary aspects of the illustrative embodiments may be implemented.
Figure 2:
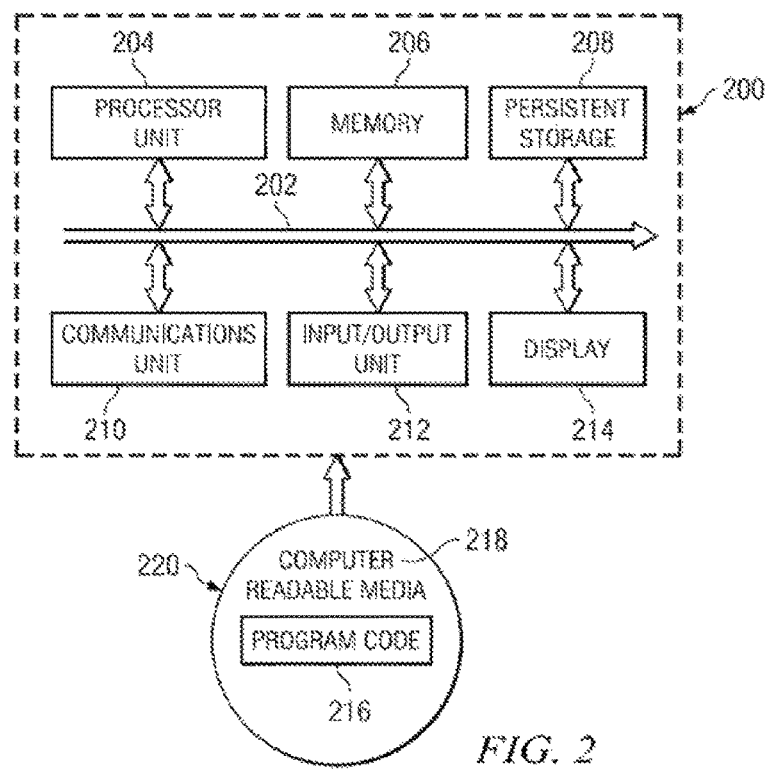
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Figure 3:
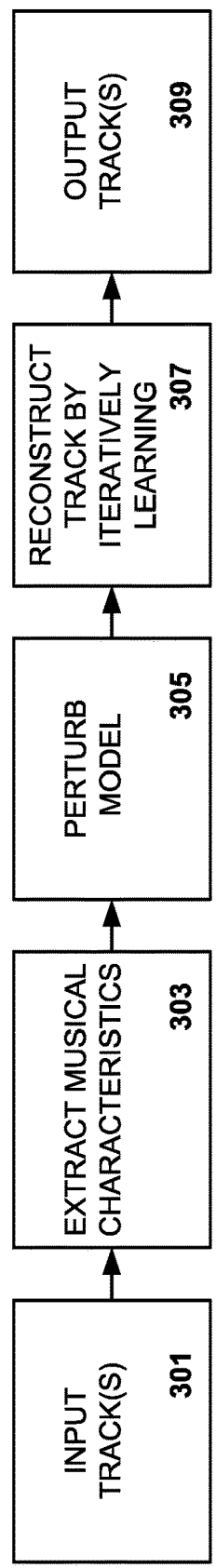
FIG. 3 is a high level flow diagram of a preferred embodiment of the invention.

FIG. 3 is a high level flow diagram of a preferred embodiment of the invention. In the embodiment, a user will select a track to input into the music composition engine, step 301. The user interface can list a set of music already stored in the music store, or it could be a web interface which would retrieve the selected piece of music from an Internet search. One preferred user interface uses voice recognition, so that the user could state something as simple as "Please start with the music from Game of Thrones". The user interface would retrieve the desired music or information on how the music could be licensed for use in the music composition engine. In a preferred embodiment of the invention, a single selection of music is used as input to the system. However, as will be discussed below, multiple music selections can be used in other embodiments of the invention. It is one intent of the invention to simplify the input required so that a layman can use embodiments of the invention. The preferred embodiments of the invention do not require extensive libraries of music to be first analyzed by the music engine or to be selected by the user.

In step 303, the music engine will extract the musical characteristics from the selected music. In the preferred embodiment, the musical characteristics are expressed as a vector or matrix of musical values. The technique used in the preferred embodiment will be discussed in greater detail below.

In step 305, the model is perturbed in a direction indicated by the user's intent. As part of the user interface, the user can indicate how the output of the music engine should be different than the input music. For example, returning to the example of a voice input user interface, the user might state: "I need 5 minutes of music for a video game and please start with the music from Game of Thrones, but make it happier". So the inputs from the user direct the music engine to a set of requirements, e.g., 5 minutes of music, music suitable for replay on a game console or personal computer, music based on Game of Thrones, but in a major key at an upbeat tempo (happy). Other intents such as "sad", "slow", "fast", or "triumphant" could be requested by the user. In alternative embodiments, intents such as genre, e.g., "classical", "jazz" and "country" could be requested by the user. For example, "I want classical music based on the Beatles' "Let It Be" of six minutes in duration" would produce a piece of music at the requisite length using classical elements with musical elements from the input music. Each of the requested perturbations is associated with a rule set, examples of which will be discussed below.

Further, embodiments of the invention also include adding "random" perturbations to the input musical piece selected as the "seed". The random perturbations can be in addition to the perturbations based on the user intent, or by themselves. In one embodiment, the random perturbations are also the user intent, when how close to or similar the newly created music should be to the input music is selected. Returning to the example of the voice input interface, if the user indicates that he wants a piece of music "just like" the input piece, relatively fewer or relatively smaller random perturbations would be added as compared to a request that the music have "a faint resemblance" to the input piece which would have more or larger perturbations. The "random" perturbations do not have to be truly random in a statistical sense; in general, the random perturbation will follow a musical rule, e.g., a pitch perturbation will be on a music whole tone or half tone in a musical scale. Other musical notions of pitch could be used, e.g., atonal, twelve tone, pitch class.

Next, in step 307, the source track is reconstructed iteratively based on the perturbation specified by the user and/or the random perturbations. In a preferred embodiment of the invention, the music engine is comprised of a plurality of Restricted Boltzmann Machines (RBM) coupled together to form a Deep Belief Network (DBN) operated in an unsupervised manner. Thus, continuing with the example above, potentially hundreds of "versions" of Game of Thrones are created using the perturbation rules. These versions of Game of Thrones are expressed by the same sort of musical vector or matrix of musical characteristics as the original input, and are only reassembled as music if a particular level within the DBN was selected for output in the particular embodiment of the invention. The culmination of the iterative reconstruction is used in embodiments of the invention as the vector from which to extract musical characteristics to be used by the music engine in the final composition.

In step 309, the final output track(s) is output by the music engine. The number of tracks output is a user configurable parameter in some embodiments of the invention. If a user selected five tracks to be created, so that a selection was available, the system would present the five musical creations. The system could either run five times using slightly different perturbations of the initial vector, or different "levels" within the neural network could be selected for creating output.

The music engine is run in an unsupervised manner. Thus, human supervision of the music engine is not required, and thus, is easier for a layman user to create musical compositions according simple directives.

Figure 4:
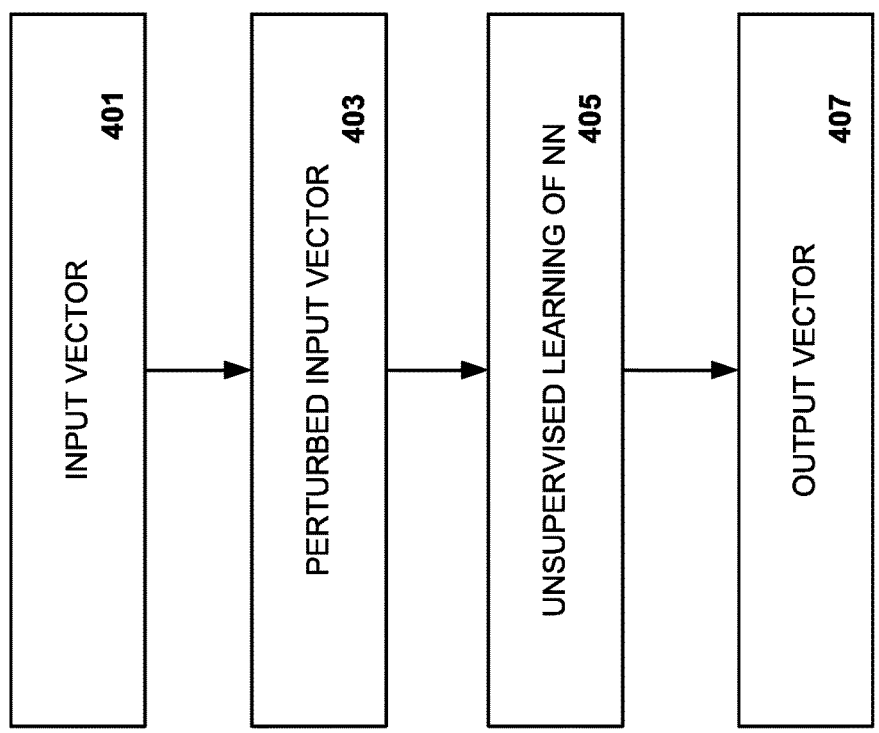
FIG. 4 is a high level flow diagram of the transformation of a vector including musical information according to the present invention.

FIG. 4 is a high level flow diagram of the transformation of a vector including musical information according to the present invention. The process begins in step 401 with the input vector of musical characteristics in a form suitable for further reconstruction by the music engine. As is mentioned above, embodiments of the invention use Restricted Boltzmann (RBM) machines. An RBM defines a distribution over some input vector x. In one embodiment, the input vector x is a midi file with musical characteristics like pitch, rhythm, velocity, etc. incorporated therein. Each neuron in the starting visible layer will hold musical information about pitch, rhythm and other musical characteristics as they exist in particular time in the input musical piece. That is, each neuron represents a temporal unit (⅛th note, 1/16th note, etc.) and a value of representing the pitch played at the corresponding time.

In step 403, the input vector is perturbed according to the rules corresponding to the intent of the user and/or a random perturbation. For example, if the user requested a "happy" or "triumphant" output, pitches selected from a key signature associated with "happy" in the system rule set would be inserted in the perturbed vector as a perturbation node. In other embodiments of the invention, instead the system changes a value in the input vector/matrix, e.g., any minor chords in the input vector can be changed to major chords, If the user requested a "faster" track, the timing of perturbation nodes in the perturbed vector information is changed appropriately, i.e. eighth notes would be inserted rather than quarter notes. In other embodiments of the invention, the system changes the input vector nodes Long sustained notes in the original input vector, e.g., whole notes, could be shortened, e.g., to half notes or quarter notes. In this step, a plurality of variations of the originally input track are produced.

In preferred embodiments, enough perturbation is added to the input vector so that the new music piece that does not sound too much like the original. There is an interplay between the amount of perturbation and the length of training. If the temporal unit for each neuron is ⅛th of a note and between 4-10 additional perturbation neurons are added per original neuron, and if the system does not train for long, the output music will be sufficiently different. In general, the less the system trains, the more different the output music will be from the input music, and the more perturbation is added, the more different the output will be.

To prevent too much perturbation from causing the output music piece to be unmusical, in some embodiments of the invention, post processing makes sure that the final output will always have notes that belong to a given key signature. In that sense, the output will always be musically accurate. However, the output sounding pleasant is a subjective opinion. In general, the longer the system trains, the more pleasant the output music will be. However, it is also true that the longer the system trains, the closer the output music becomes to the original piece, and there is a dilemma in choosing to training for longer times since a new and different song is desired. Therefore, to compensate for longer training times so that the output will be pleasant, the system can add more perturbation to make sure the output remains different.

The neural networks then perform unsupervised learning of the variations of the original track produced as described above, in step 405. Because of the variations according to the perturbations, the learning is much "richer" than it would have been based on the single input track. Yet the advantage for the user is that a single input track is required, rather than a music library and a set of music rules as in the prior art. The learning process is described in greater detail below.

Finally, in step 407, the output music piece is produced by the music engine. The output track may resemble the original input track, but changed in the ways specified by the user. As discussed above, in one preferred embodiment, the values in the neurons marked as "perturbation" neurons are removed from the musical vector or matrix in the last level of the DBN to produce the output piece. In another embodiment, the perturbed neurons need not be removed from the output which will make the output music more certainly different from the input piece as additional neurons have been added.

Figure 5:
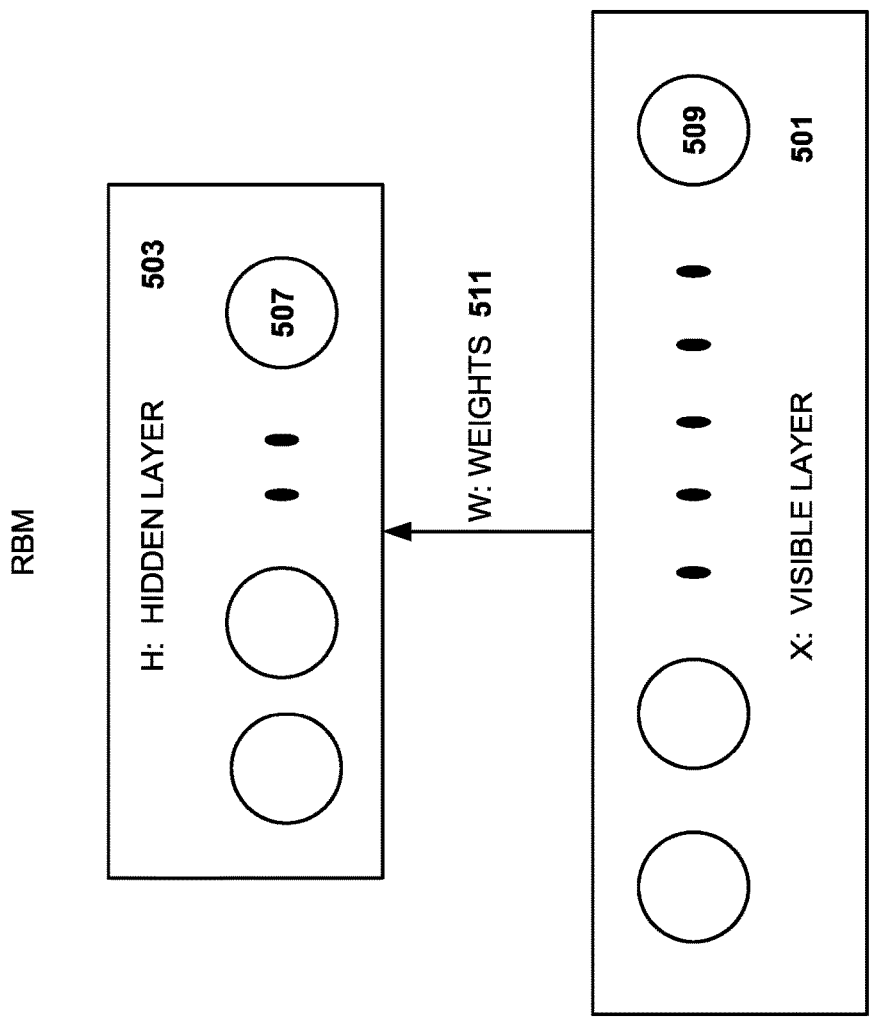
FIG. 5 depicts a general Restricted Bolztmann Machine (RBM) which can be used in the present invention.

FIG. 5 depicts a general Restricted Boltzmann Machine (RBM) which can be used in the present invention. An RBM is a stochastic neural net with one visible layer 501 of neural net nodes/units which communicate the values, in the present invention, the input set of musical characteristics, to a hidden layer 503 of neural net nodes/units. In a neural network, each node is a neuron-like unit whose binary activations depend on the neighbor node to which it is connected. Stochastic means that these activations have a probabilistic element. Restricted Boltzmann Machines, and neural networks in general, work by updating the states of some neurons given the states of others. A Restricted Boltzmann Machine is different from other Boltzmann machines in that the neurons in the visible layer are not connected to each other (restricted) and the neurons in the hidden layer are also not connected to each other. In a learning mode, the hidden nodes act as latent variables which allow the RBM to capture higher order information in the input set entered into the visible layer. Learning comprises finding a set of weights and biases 511 which make the input vector 501 good. In the preferred embodiments of the invention, the learning is performed in an unsupervised manner so that the music engine automatically discovers the higher order musical information without user intervention beyond selection of the initial input parameters.

Restricted Boltzmann Machines are used to perform a binary version of factor analysis. Rather than asking a user to rate a set of music on a scale, or to indicate which musical characteristics they favor, the music vector of musical characteristics from the original piece of music as modified by the perturbations are arranged as nodes in the visible layer, and the RBM will try to discover latent factors that can explain the musical characteristics which are appealing to the user as evidenced by the choice of music (and as modified by the user's intent) and store these values in the nodes in the hidden layer. In the present invention, the initial visible nodes represent the musical characteristic vector from the input piece, plus the perturbation nodes representing the user intent and/or random perturbations and hidden nodes represent the relationships between the visible nodes.

Multiple nodes are in each layer, for example, node 509 in visible layer 501 and node 507 is in hidden layer 503. The number of nodes selected in the visible layer is determined by the input song, i.e. if the input song has ten ¼ notes, and the temporal unit for each neuron is a quarter note (¼th of a note), then the starting number of neurons in the visible layer is 10 (before perturbation). If the temporal unit of each neuron is ⅛th of a note, then the number of neurons in the visible layer is 20. Once it is determined that the song has 10 neurons (i.e 10 quarter notes with each neuron representing a ¼ note), then the perturbation neurons are added to the input vector. In one preferred embodiment, the unit of perturbation adds 4 perturbation neurons for every ¼th note in the input music piece. For a 10 quarter note input song, this means that the total number of neurons in the visible layer will be=50 neurons ((1 actual ¼th note neuron+4 perturbation neuron)*10=50 neurons). In one preferred embodiment, the hidden layer typically contains half the neurons in the visible layer. Those skilled in the art would recognize that other ratios of neurons between the visible and hidden layers are possible. In general, the number of neurons in the hidden layer should be less than the number of neurons in the visible layer. Thus, the number of neurons depends on the length of the song and the amount of perturbation that is added. Longer songs have more neurons. More perturbation also indicates more neurons.

As another illustrative embodiment, given that the temporal unit of each neuron is ⅛th note, however, in the input song, some notes last for ½ note. In this case, this half note is divided into 4 neurons (each neuron represents the same pitch, but is only ¼th note long). Then each neuron also has an additional tie neuron associated with it, indicating it is part of a longer note. Therefore, each temporal unit will now contain 2 neurons—(a) one indicating the actual pitch being played and (b) two indicating whether it is part of a tie note (an elongated note or note).

In preferred embodiments of the invention, the input vector of the lowest level RBM in the DBN is altered by adding new components to the input vector and marking them as perturbation nodes. That is, if a user requested a "happy" output, the perturbation neurons would be assigned with pitch values from a major keys associated with a "happy" mood. If the user requested, a "faster" track, the perturbation neurons would be assigned eighth note values rather than quarter note or half note values. By marking the added neurons as perturbation neurons, they can be removed from the extracted vectors to produce the final output music piece(s).

Figure 6:
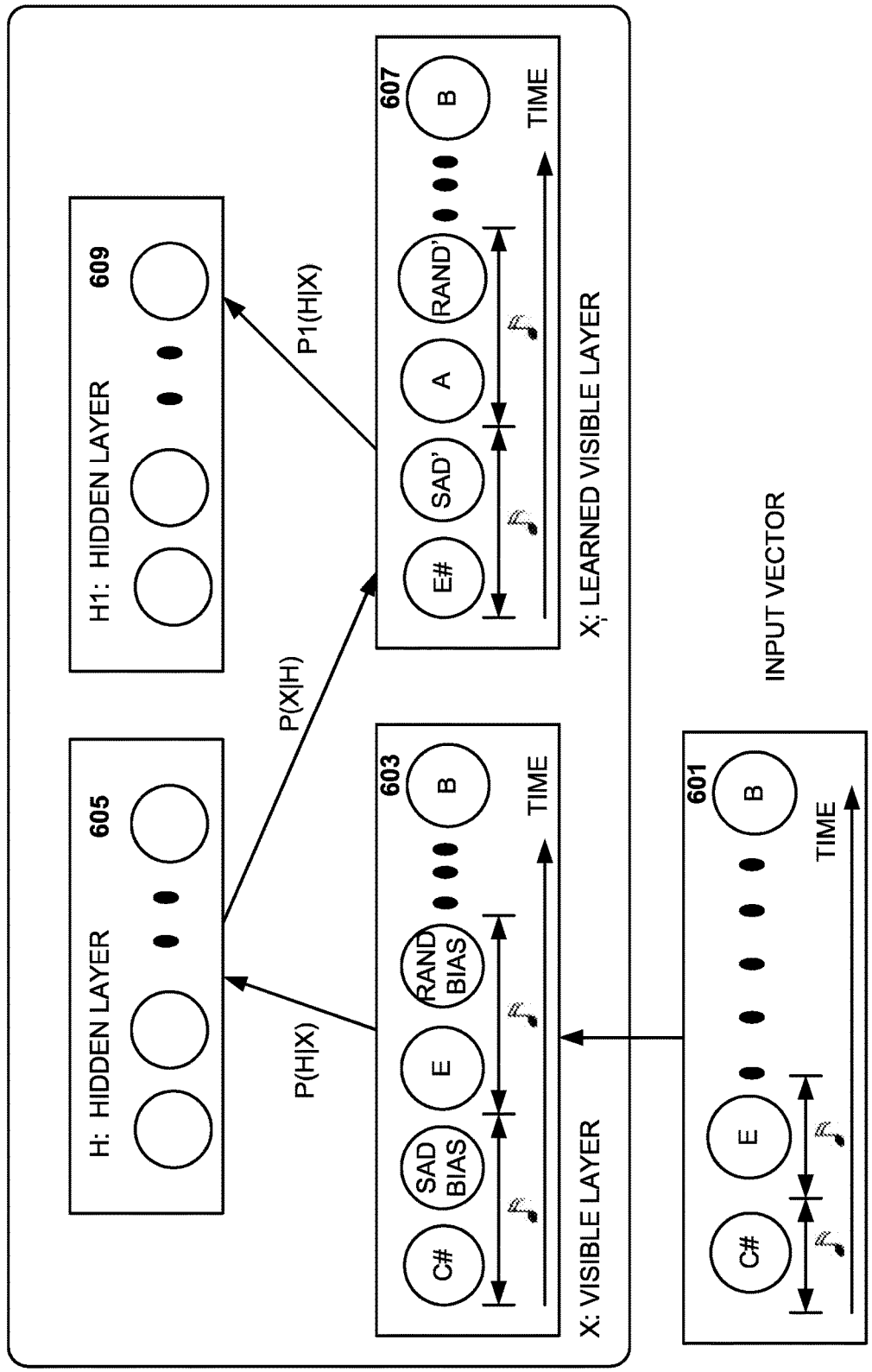
FIG. 6 depicts the operation of an RBM according to one embodiment of the present invention.

In the preferred embodiment, the RBMs are trained using a process called Contrastive Divergence. This process is described in reference to FIG. 6.

As their name implies, Restricted Boltzmann Machines (RBMs) are a variant of Boltzmann machines, with the restriction that their neurons must form a bipartite graph: a pair of nodes from each of the two groups of units, commonly referred to as the "visible" and "hidden" units respectively, may have a symmetric connection between them, and there are no connections between nodes within a group. By contrast, "unrestricted" Boltzmann machines may have connections between hidden units. This restriction allows for more efficient training algorithms than are available for the general class of Boltzmann machines, in particular, the gradient-based Contrastive Divergence algorithm. Contrastive Divergence involves three steps:

(a) Stochastically approximate features of the visible layer and represent it in the hidden layer.

(b) Reconstruct the visible layer using an approximate version of hidden layer using Gibbs Sampling.

(c) Iterate until reconstructed (learned) visible layer is similar to original hidden layer In a preferred embodiment, Gibbs Sampling is used for reconstructing the visible layer. In Gibbs Sampling, each variable is sampled given the other variables, according to the following procedure:

(a) Sample the value of all the elements in one layer (e.g., the hidden layer), given the value of the elements of another layer (e.g., the visible layer).

(b) Alternate between the layers—i.e. sample the values of the visible layer given the values of the hidden layer.

As shown in the drawing, according to one embodiment of the present invention, new music can be created in real time by adding perturbations to an input vector which expresses the music characteristics of the selected input piece of music. This input vector 601 is shown as a set of values arranged in a vector according to time. As shown, C#, E . . . B represent the notes in the song "Mary Had a Little Lamb" in the order in which they occur. Other musical characteristic information can also be in the vector such as chords, timing, key change, dynamics (e.g., crescendo, fortissimo), etc., each in their own neuron, however, for simplicity in illustration, only the pitch information is illustrated.

The input vector 601 is fed into the visible layer 603 of the RBM wherein each characteristic is fed into a node or neuron of the visible layer. In some embodiments of the invention, the input vector can be expressed as a matrix. According to the invention, these characteristics are perturbed according to an intent bias and/or a random bias. As shown in the drawing in this embodiment, the perturbations are inserted as their own nodes or neurons in the visible layer. Here, the user has chosen a "sad" ion of "Mary Had a Little Lamb", so pitches associated with sadness, e.g., a D# minor key, are inserted into neurons in the visible layer. Also as shown in the drawing, a random perturbation is added into the visible layer to add richness to the discovery process.

The hidden layer of the RBM is trained on the relationships between the elements of the perturbed vector 603. This is an iterative process.

The visible layer 603 of neurons is connected to the hidden layer 605 of neurons using a set of weights. On the first iteration, these weights are assigned a random value. These weights are then multiplied with the value of the neurons in the visible layer, and then passed through an activation function to arrive at the first values for the neurons in the hidden layer. The neurons in the hidden layer hold P(H/X). P(H/X) describes the probability of the hidden layer given the values of the visible layer and the weight matrix.

Next, the values in the hidden layer 605 are sampled to populate the first learned visible layer 607 which contains nodes corresponding both the perturbed according to intent bias and random bias. The following steps explain how this is done.

To reconstruct the learned visible layer 607, given the hidden layer 605 just obtained from the previous step, the values of the neurons in the hidden layer (P(H/X) obtained from the previous step) are multiplied by the transpose matrix of the weights. The result of the multiplication is passed through an activation function. The result from the activation function will now represent the new learned visible layer also known as P(X|H). P(X|H) is the probability of the visible layer given the values of the hidden layer and the weight matrix.

This concludes the first iteration of learning. To determine the error of learning, the system subtracts the value of each neuron from the original visible layer from the value of each neuron in the learned visible layer, sums these differences, and takes the root mean squared value of these differences. Then the system updates the weight matrix based on the error that has been calculated. In the second iteration, the system uses the learned visible layer of the previous iteration as the starting visible layer, calculates P1(H/X) (i.e. the probability of the hidden layer given the updated weight matrix and the learned visible layer). Next, the system calculates P1(X|H) (not shown in figure) (i.e. probability of second learned visible layer given the weight matrix and the hidden layer from the previous step). The system then determines the error of learning the second iteration (i.e. subtracts original visible layer from the second learned visible layer, sums the differences, and takes the root mean squared error.) Then, the weight matrix is updated based on this error. This concludes the second iteration of training the first RBM. This process continues until training is stopped once an acceptable error limit is reached. Note, training iterations can stop whenever the user chooses by configuration of the RBM. This is how the first RBM is trained.

Once we have trained the first RBM, the final values of the neurons of the hidden layer obtained during the last iteration of training of the first RBM is used as the visible layer for the next RBM. Then the next RBM is trained as discussed above for the first RBM.

Figure 7:
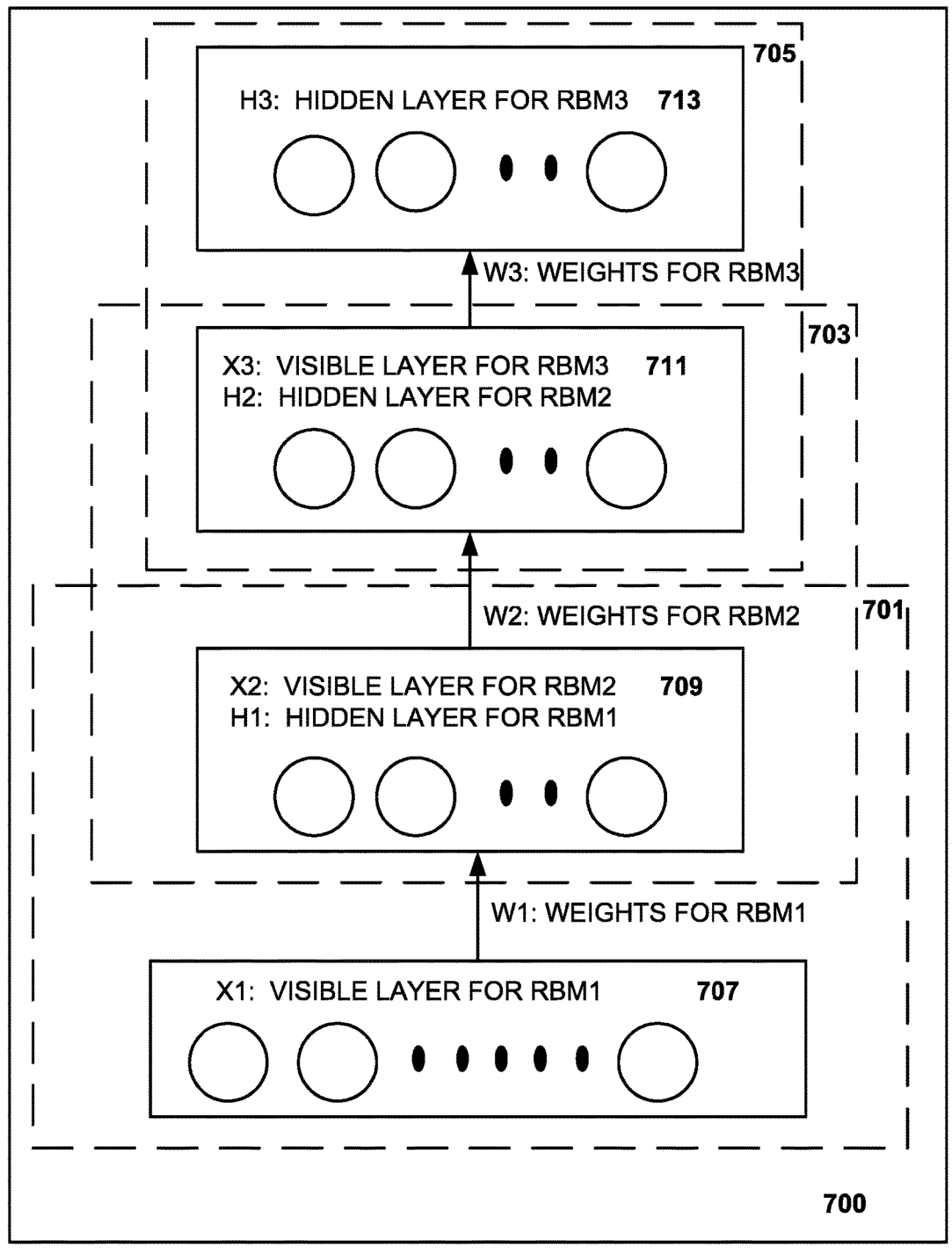
FIG. 7 depicts the operation of a Deep Belief Network (DBN) according to another embodiment of the present invention.

As depicted in FIG. 7, a Deep Belief Network (DBN) 700 is composed of a plurality of layers of Restricted Boltzmann Machines (RBM) 701, 703, 705 or other like neural networks arranged in a hierarchical manner, where each sub-network's hidden layer serves as the visible layer for the next. This also leads to a fast, layer-by-layer unsupervised training procedure, where contrastive divergence is applied to each sub-network in turn, starting from the "lowest" pair of layers (the lowest visible layer being a training set). Once an RBM has been trained, that is, has learned a representation of the visible layer to the hidden layer, the probabilities of a first RBM in the hidden layer are fed as the visible layer to the next RBM in the DBN.

FIG. 7 shows the first three RBMs 701, 703, 705 of the DBN 700 for ease of illustration. In some embodiments of the invention, there would be many more layers of RBMs, depending on the embodiment. The first RBM 701 contains the initial visible layer 707 which includes the input vector values and any perturbed values. After training, the values in hidden layer 709 of the first RBM are used in the nodes of the second visible layer of RBM 703. Next, the nodes in the next hidden layer 711 belonging to the second RBM 703 are trained and the trained values are used as the visible layer for the third RBM 705. Finally, the nodes in the hidden layer 713 of the third RBM 705 are trained. In general, each higher level RBM will have fewer neurons than the RBM below it. One embodiment of the invention halves the neurons in each succeeding RBM. For example, if the first RBM 701 starts with 200 neurons in the first visible layer 707, then there will be 100 neurons in the hidden layer 709 of the first RBM 701. This hidden layer 709 (after training) will act as visible layer for the next RBM 703. The hidden layer 711 in the second RBM 703 will then contain 50 neurons etc.

This process continues until the final layer of the Deep Belief Network is reached. In one preferred embodiment of the invention, this final layer is used to produce the output of the music composition system of the present invention. Using Gibbs sampling, the embodiment works down from the topmost hidden layer (for example, the third RBM hidden layer 713 in the drawing) to reconstruct a layer analogous to the bottommost visible layer (for example, the first RBM visible layer 707). Once the neuron values are calculated for the bottommost visible layer, the perturbation neurons are removed, and then, the final set of neurons remains which represents the learned musical piece. If another learned piece is needed, the system performs the training again with different perturbations.

As described above, no additional biases (perturbation nodes) are added in a higher level visible layer, however, in another embodiment, additional perturbation can be added to each RBM in the DBN. Also in another embodiment, the perturbation neurons need not be removed from the reconstructed bottommost visible layer to obtain the final musical output.

If a particular length of music is desired, the system can shorten the output music, or if a longer piece is needed, concatenate multiple pieces or segments of pieces to arrive at the desired length. In another embodiment of the invention, if the user wants a piece of a certain length, the number of nodes in the input music vector is chosen to achieve the desired output length. For example, multiple learned pieces of the same input can also be concatenated to get a longer desired output—or some nodes can be removed from the visible layer to get a smaller desired output.

One of the most dispositive musical characteristics in terms of creating the musical output is the pitch associated with the melody of the input vector at a given point in time. As is mentioned above, when the input vector is perturbed in the initial visible layer of the first RBM, pitch values associated with different key signatures or intervals within the original music input can be inserted into a neuron or node to effect the intent of the user, e.g., "sad", "happy", "scary" and so forth. Thus, in one preferred embodiment of the invention, rules are created so that in response to an expressed user intent, pitches having an interval from a note in the input piece are inserted into the first visible layer. Table 1 contains a set of such rules for the key of C.

Perturbation Neurons for Different Moods and Intent:

| Interval and example notes | User Intent | Comments |
|---|---|---|
| Major seventh C to B | "Spooky", "Scary", "Strange" | Discordant, driving feeling to resolve it. It has a strange and ethereal feel. |
| Minor seventh C to B flat | "Mysterious", "Scary" | Feeling of suspense and expectancy. |
| Major sixth C to A | "Triumphant", "Happy" | Uplifting sound associated with major intervals associated with movement. |
| Minor sixth C to G# | "Sad", "Sleepy" | Sad or melancholy sound. Used in Chopin's Nocturnes. |
| Fifth C to G | "Happy" | Peaceful, open, cosmic, blissful. |
| Augmented $4^{th}$ C to F# | "Scary" | Discordant sound in harmony. Ethereal sound when used in melody rather than harmony. |
| Fourth C to F | "Happy", "African" | Open, active, unresolved feeling about it. Used in African music |
| Major third C to E | "Happy" | Bright happy quality of familiar harmonies and melodies |
| Minor third C to D# | "Sad", "Scary" | Melancholy, or gloomy. The predominant sound of minor keys. |
| Major second C to D | "Scary", "Slavic" | Discordant. Used in Slavic music. |
| Minor second C to C# | "Scary" | Very discordant. Scary music. |

Using these rules, if the user intent was for a "happy" output, the input vector would be perturbed by placing notes having an interval of a major third, fourth, fifth or sixth from an adjacent pitch in the vector. If the user intent was for a "sad" output, the vector would be perturbed by inserting notes having an interval of a minor third or minor sixth to adjacent pitches in the input vector.

Alternatively, a different set of rules could insert pitches from different key signatures which are associated with different moods. The selected user intent would be used to select from the rules. One skilled in the art would recognize that many synonyms could be added to the rule set to help the system determine user intent.

TABLE 2

Rule set for key signature

| Key Signature | User Intent |
|---|---|
| C major: | "happy", "warlike", "studying" |
| C minor: | "lost", "sad" |
| D major: | "joyous", "very happy", "very warlike" |
| D minor: | "serious", "pious", "religious" |
| Eb major: | "cruel", "hard", "mean" |
| E major: | "active", "fighting", "boisterous" |
| E minor: | "feminine", "amorous", "sad" |
| F major: | "furious", "angry", "agitated" |
| F minor: | "lost", "sad" |
| G major: | "serious", "triumphant", "magnificent" |
| G minor: | "serious", "sad" |
| A major: | "joyful", "happy", "pastoral" |
| A minor: | "tender", "sad" |
| B major: | "harsh", "angry" |
| B minor: | "solitary", "sad", "melancholic" |
| Bb major: | "magnificent", "joyful", "running" |
| Bb minor: | "obscure", "terrible", "very sad" |

For example, if the user indicated that the output music should be "happy", the system could select notes from one of the key signatures A major, C major or D major. If the user indicated that the output music should be "sad", the system could select notes from one of the key signatures B minor, F minor or E minor. Several perturbation nodes inserted together in the input vector will tend to establish the new key. Another embodiment uses post processing to make sure that the reconstructed vector after training is consistent. Each neuron is examined to determine whether it lies in the desired key signature. If it doesn't, the post processor modifies the neuron to make it fit into the key signature, for example, changing C to C# to make the neuron fit a D major key.

Yet other rule sets can be used to create musical output in a desired genre, e.g., classical, rock, jazz, blues, rap, etc. For example, if a user expressed an intent to create a blues version of "Silent Night", the "blues" rule could contain instructions to add perturbations in a "blues" scale, flattening the third and fifth notes in the desired key, perturbations with a "blues" rhythm, perturbations using the I, IV and V chords in the desired key and so forth. Alternatively, a "blues" song, e.g., "I'm Ready" by Muddy Waters, might be added to the input music vector as discussed in the two song embodiment below in connection with FIG. 8.

Figure 8:
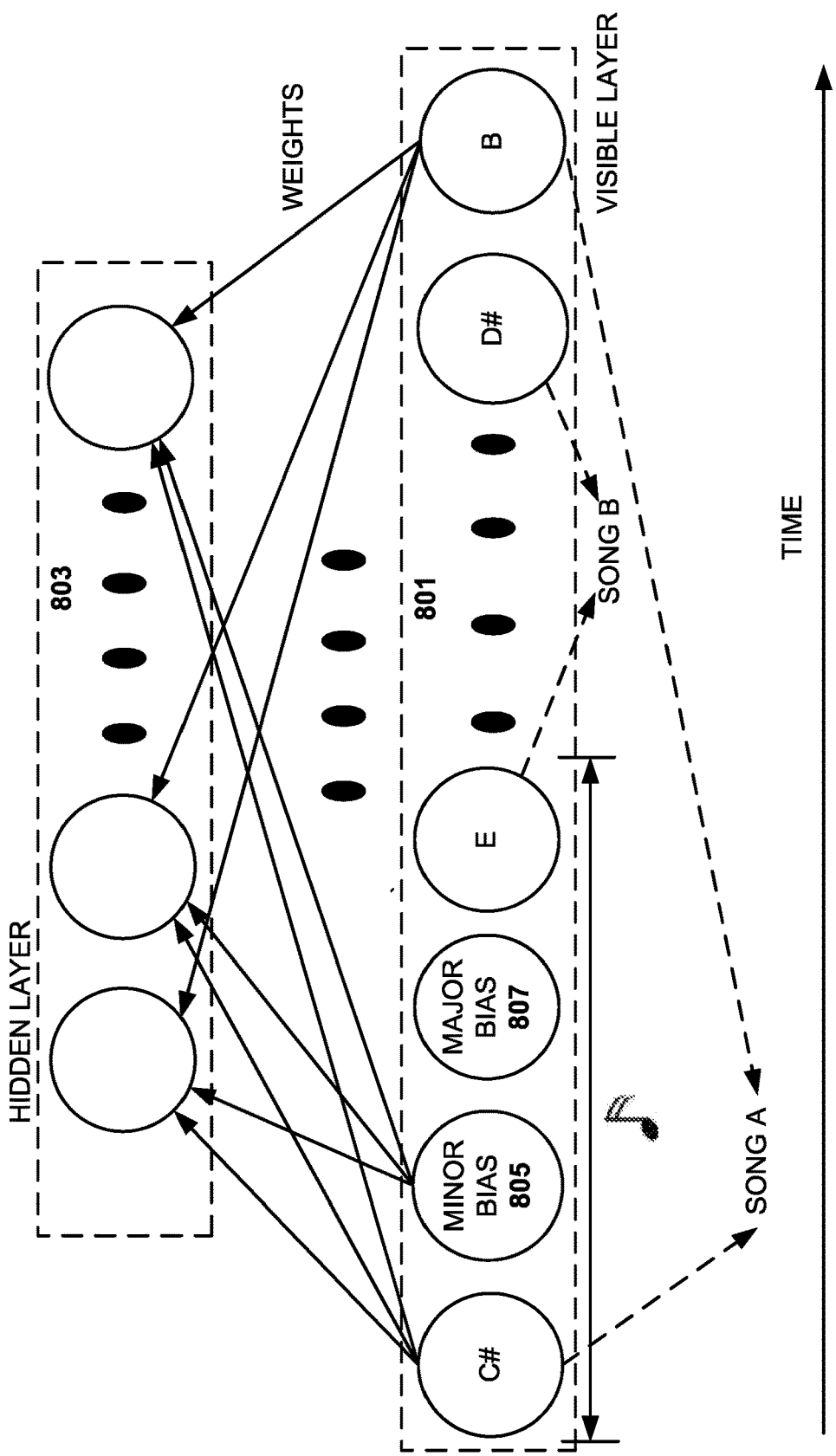
FIG. 8 depicts the configuration of an RBM according to another embodiment of the invention.

FIG. 8 depicts the operation of an RBM according to another embodiment of the invention. In this embodiment, two songs are used to create the first visible layer 801 for the system. As shown, musical characteristics from Song A, for example, "Mary Had A Little Lamb" and from Song B, for example, "O Susannah" are intermingled Let's say that the temporal unit of splitting is a ¼ note. The first ¼ note of Mary is used, next the perturbations are added, then the 1st ¼ note of Susannah is used, the perturbations are added, then the next ¼ note of Mary is used and so on and so forth. In another embodiment, the first few notes of Mary and then the next few notes of Susannah and some perturbation neurons, and so on. If the user wants the output music to be "more" like Mary Had a Little Lamb, the system can achieve that goal in several ways: (a) by adding more Mary neurons, (b) by adding fewer Susannah neurons, (c) by adding less perturbation to Mary, (d) by adding more perturbation to Susannah. If there was a phrase that the user wanted particularly, the neurons that represent that phrase can be repeated more frequently.

As described above, the hidden layer 803 is trained so that the higher level music relationship can be extracted. Also, as described above, the values from the hidden layer would be passed up to successively higher levels of RBMs in the DBN until the final layer of the Deep Belief Network is reached.

Also present in this embodiment are perturbation nodes respectively named "Major Bias" 805 and "Minor Bias" 807. This represents that the system could add pitches into the perturbation nodes from a major and/or a minor key signature according to an expressed user intent.

The invention has many possible applications and embodiments. Because of the simplicity of input, a cloud based cognitive music composition service could be provided to users. A streaming service could provide new music, wherein the user may suggest music that they like and the system generates more similar music. Producers and composers can use the invention to create music based on intent (e.g., mood-slow, happy, vibrant, or purpose—running, studying). Music can be created for hold music for conference calls, waits for customer service, elevator music and so forth.

Figure 9:
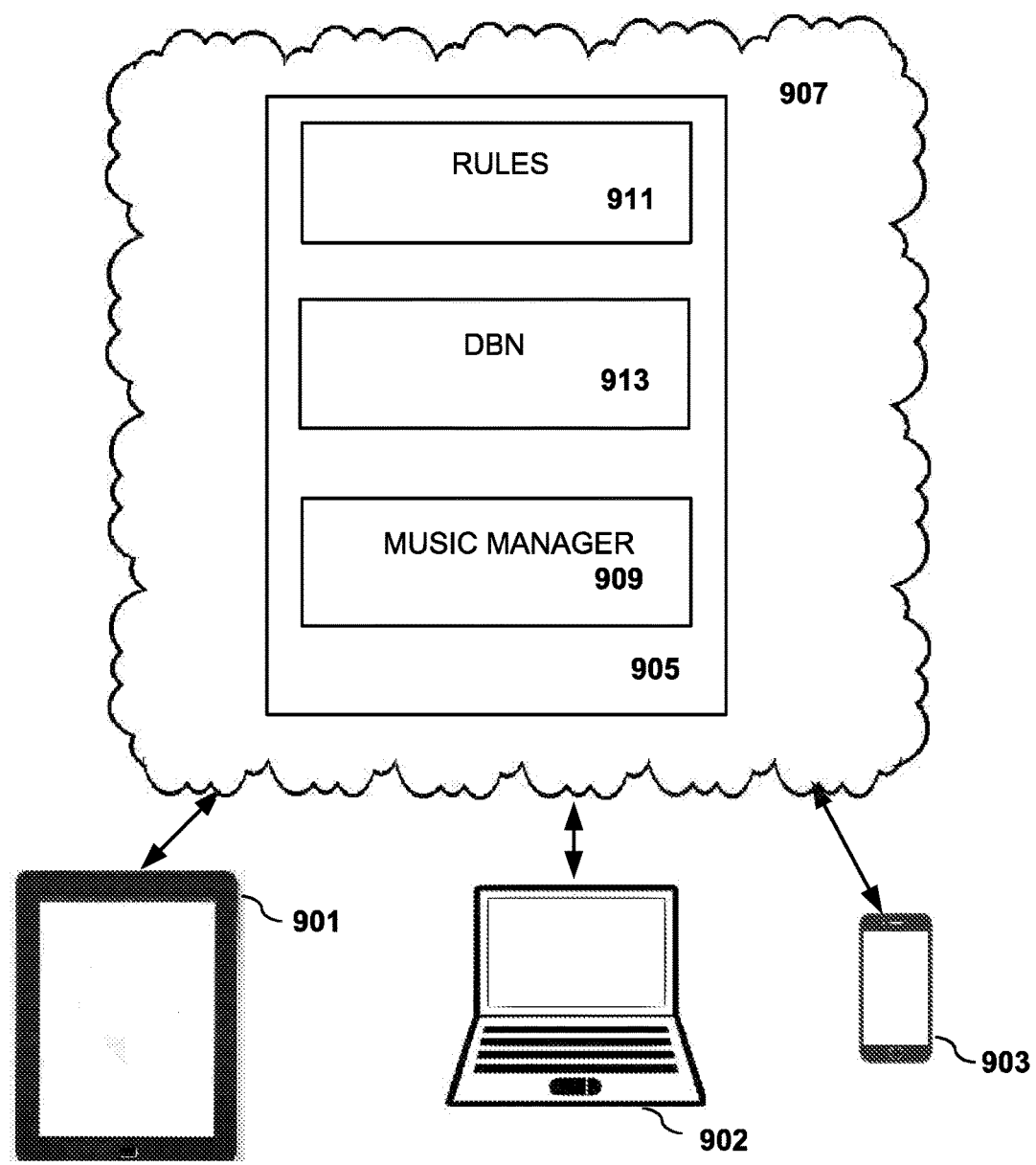
FIG. 9 illustrates a cloud service embodiment of the invention providing music composition services to a plurality of users.

FIG. 9 shows a distributed embodiment of the invention. In the figure, client tablet 901, client laptop 902 and client smart phone 903 are communicatively coupled to a cloud based cognitive music composition service 905 found in cloud environment 907. As shown, the music manager element 909 receives requests from the user devices 901, 902, 903 and with reference to the rules 911 translates them into a perturbed music vector or matrix to DBN 913. The music manager 909 then takes the output from the DBN 913 and formats it into music in an acceptable format for the requesting device. The client device input from the respective devices can be different. In one embodiment of the invention, the user interfaces from the tablet 901 and laptop 902 might be graphical user interfaces, while the smart phone user interface might be a voice input based interface.

Figure 10:
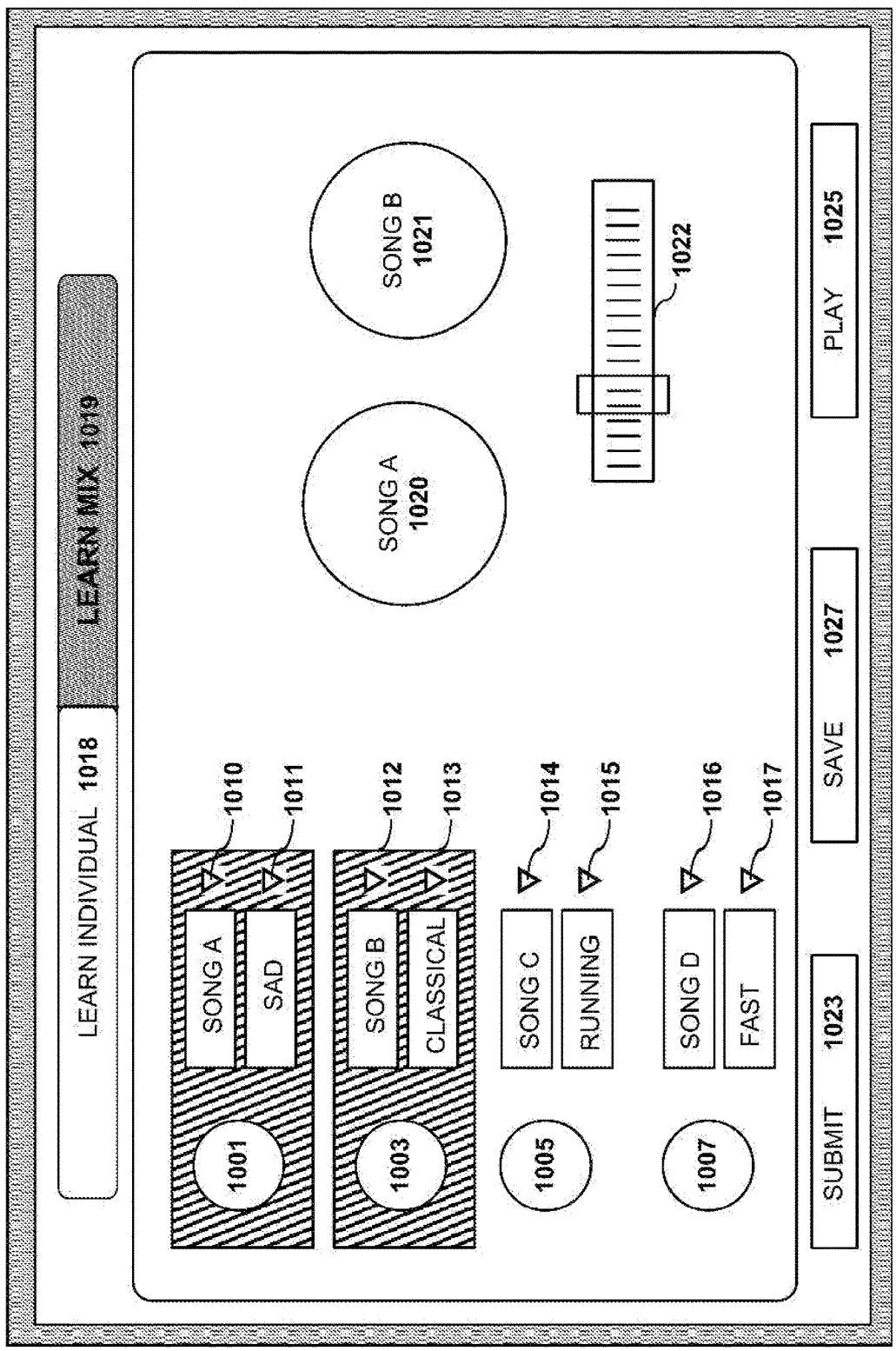
FIG. 10 shows a graphical user interface for an embodiment of the invention for a tablet computer.

FIG. 10 shows one embodiment of a user interface suitable for a tablet computer. A set of four input icons 1001, 1003, 1005, and 1007 is available for user selection of songs and intent for the music composition service. Pulldown menus 1010, 1012, 1014 and 1016 are available to select from the available songs in the library. Pulldown menus 1011, 1013, 1015 and 1017 are available to select from the available user intents. As shown, in input box 1001, the user has selected "Song A" and a "sad" user intent. In input box 1003, the user has selected "Song B" and a "classical" user intent.

This embodiment of the invention allows the user to choose a single song as input by selecting the "Learn Individual" button 1018, or multiple songs to input by selecting the "Learn Mix" button 1019. In the drawing, the "Learn Mix" mode has been selected as well as "Song A" and "Song B" with their respective user intents. This selection causes an icon 1020 representing Song A and an icon 1021 representing Song B to appear in the interface. A slider 1022 allows the user to control how much influence Song A and Song B should have on the final musical creation. In the drawing, the user has selected for Song A to have a stronger influence. When the user is satisfied with the selections, the submit button 1023 is selected by the user. In response to the user request, the music composition service will start with the musical characteristics from Song A and Song B, add perturbations according to the expressed user intent for each song and add these parameters to the first visible layer of the DBN. Also as the user has indicated that Song A is to have more influence on the output music piece, more neurons in the input vector will have musical characteristics from Song A. For example, some of the notes from Song A may be repeated in multiple neurons in the first visible layer. After the music composition service has completed, the play button 1025 is enabled, indicating to the user that the musical creation is available. If the user is satisfied with the output, it can be saved using save button 1027. Alternatively, the user can change the selected parameters and try again.

Those skilled in the art would recognize that many user interfaces could be used for a user to request services from the music composition service including a voice user interface or user interface have text entry fields in which a user enters one or more desired musical selections as input pieces.

The subject matter described herein has significant advantages over the prior art. The music engine is run in an unsupervised manner. Thus, human supervision of the music engine is not required, and thus, it is easier for a layman user to create musical compositions according simple directives. Prior art requires extensive libraries of music, tracks and musical rules. The prior art predictive models are pretrained, requiring extensive time, and require a good deal of musical knowledge to operate. The invention can produce a musical composition in real time with no prior training on the part of the system or operator. Most prior art computer aided music composition does not account for the intent of the operator, i.e. the desired result, and if they do so the input needed to ask for a desired result is nonintuitive and complicated. The present invention does not need extensive musical knowledge on the part of the operator. Furthermore, the invention allows the user to state in simple and intuitive terms the desired result: "Make it like Game of Thrones but happier", "Use the Charlie Brown theme, but make it sound more like Beethoven".

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

The scheme described herein may be implemented in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the music composition functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the administrator configurator and the suspension workflow components are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, namely, identity access and management systems, as well as improvements to the functioning of recertification processes within such systems.

The invention claimed is:

1. A method for generating a musical composition, comprising:
   receiving a first set of musical characteristics from a first input musical piece and a second set of musical characteristics from a second input musical piece;
   receiving user input that an output musical piece should more closely resemble the first input musical piece than the second input musical piece;
   providing the second set of musical characteristics together with the first set of musical characteristics as an input vector;
   perturbing the first and second sets of musical characteristics to create a perturbed input vector as input in a first set of nodes in a first visible layer of an unsupervised neural net, the unsupervised neural net comprised of a plurality of computing layers, each computing layer composed of a respective set of nodes, wherein the perturbed vector is changed so that the first input musical piece has a greater effect on the output musical piece than the second input musical piece by including the first set of musical characteristics in more nodes of the first set of nodes in the first visible layer of the unsupervised neural net than the second set of musical characteristics;
   operating the unsupervised neural net to calculate an output vector from a higher level hidden layer in the unsupervised neural net; and
   using the output vector to create an output musical piece.

2. The method as recited in claim 1, further comprising receiving an expressed user intent, wherein the perturbing is performed by inserting values into a set of perturbation nodes in the first visible layer according to a rule selected according to the expressed user intent.

3. The method as recited in claim 2, wherein in response to an expressed user intent, pitches having an interval from a note in the input piece are inserted into the set of perturbation nodes in the first visible layer.

4. The method as recited in claim 2, further comprising:
   receiving a user input indicating a degree of similarity for the output musical piece to the first musical input piece; and
   inserting values into the set of perturbation nodes according to the degree of similarity.

5. The method as recited in claim 2, wherein the rule directs a selection of a set of pitches from a key signature associated with the user intent.

6. The method as recited in claim 2, wherein the perturbing includes inserting random values into the set of perturbation nodes in the first visible layer.

7. An apparatus, comprising:
   a processor;
   computer memory holding computer program instructions executed by the processor for generating a musical composition, the computer program instructions comprising:
   program code operative to receive a first set of musical characteristics from a first input musical piece and a second set of musical characteristics from a second input musical piece;
   receiving user input that an output musical piece should more closely resemble the first input musical piece than the second input musical piece;
   providing the second set of musical characteristics together with the first set of musical characteristics as an input vector;
   program code operative to perturb the first set of musical characteristics to create a perturbed input vector as input in a first set of nodes in a first visible layer of an unsupervised neural net, the unsupervised neural net comprised of a plurality of computing layers, each computing layer composed of a respective set of nodes, wherein the perturbed vector is changed so that the first input musical piece has a greater effect on the output musical piece than the second input musical piece by including the first set of musical characteristics in more nodes of the first set of nodes in the first visible layer of the unsupervised neural net than the second set of musical characteristics;
   program code operative to operate the unsupervised neural net to calculate an output vector from a higher level hidden layer in the unsupervised neural net; and
   program code operative to use the output vector to create an output musical piece.

8. The apparatus as recited in claim 7, wherein the computer program instructions further comprise:
   program code operative to receive an expressed user intent; and
   program code operative to perform the perturbing by inserting values into a set of perturbation nodes in the first visible layer according to a rule selected according to the expressed user intent.

9. The apparatus as recited in claim 8, wherein the computer program instructions further comprise program code operative to insert pitches having an interval from a note in the input piece are inserted into the set of perturbation nodes in the first visible layer in response to an expressed user intent.

10. The apparatus as recited in claim 8, wherein the computer program instructions further comprise:
program code operative to receive a user input indicating a degree of similarity for the output musical piece to the first musical input piece; and
program code operative to insert values into the set of perturbation nodes according to the degree of similarity.

11. The apparatus as recited in claim 8, wherein the computer program instructions further comprise program code operative to direct a selection of rule to insert a set of pitches from a key signature associated with the user intent into the first visible layer.

12. A computer program product in a non-transitory computer readable medium for use in a data processing system, the computer program product holding computer program instructions which, when executed by the data processing system, for generating a musical composition, the computer program instructions comprising:
program code operative to receive a first set of musical characteristics from a first input musical piece and a second set of musical characteristics from a second input musical piece;
receiving user input that an output musical piece should more closely resemble the first input musical piece than the second input musical piece;
providing the second set of musical characteristics together with the first set of musical characteristics as an input vector;
program code operative to perturb the first set of musical characteristics to create a perturbed input vector as input in a first set of nodes in a first visible layer of an unsupervised neural net, the unsupervised neural net comprised of a plurality of computing layers, each computing layer composed of a respective set of nodes, wherein the perturbed vector is changed so that the first input musical piece has a greater effect on the output musical piece than the second input musical piece by including the first set of musical characteristics in more nodes of the first set of nodes in the first visible layer of the unsupervised neural net than the second set of musical characteristics;
program code operative to operate the unsupervised neural net to calculate an output vector from a higher level hidden layer in the unsupervised neural net; and
program code operative to use the output vector to create an output musical piece.

13. The computer program product as recited in claim 12, wherein the computer program instructions further comprise:
program code operative to receive an expressed user intent; and
program code operative to perform the perturbing by inserting values into a set of perturbation nodes in the first visible layer according to a rule selected according to the expressed user intent.

14. The computer program product as recited in claim 13, wherein the computer program instructions further comprise program code operative to insert pitches having an interval from a note in the input piece are inserted into the set of perturbation nodes in the first visible layer in response to an expressed user intent.

15. The computer program product as recited in claim 13, wherein the computer program instructions further comprise program code operative to direct a selection of rule to insert a set of pitches from a key signature associated with the user intent into the first visible layer.

16. The computer program product as recited in claim 13, wherein the first set of musical characteristics, the second set of musical characteristics and perturbations are intermingled in the perturbed input vector which is in the first set of nodes in the first visible layer of the unsupervised neural net.

17. The computer program product as recited in claim 13, wherein the computer program instructions further comprise:
program code operative to select a second input musical piece from which the second set of musical characteristics is derived; and
wherein the second input musical piece is selected according to a rule based on the expressed user intent.

* * * * *